Figure 1:
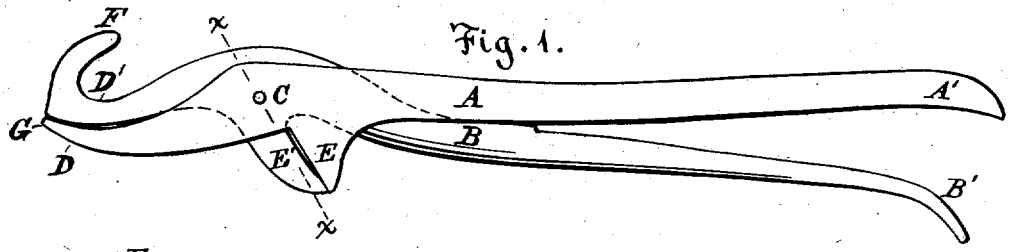

J. W. ROSS.

KITCHEN IMPLEMENT.

No. 10,086. Reissued Apr. 11, 1882.

Witnesses:
G. B. Fowler.
Wm. A. McElvee.

Inventor:
John W. Ross
By W. Burris
Atty.

N. PETERS, Photo-Lithographer, Washington, D. C.

UNITED STATES PATENT OFFICE.

JOHN W. ROSS, OF SANTA CLARA, CALIFORNIA.

KITCHEN IMPLEMENT.

SPECIFICATION forming part of Reissued Letters Patent No. 10,086, dated April 11, 1882.

Original No. 241,822, dated May 24, 1881. Application for reissue filed March 6, 1882.

*To all whom it may concern:*

Be it known that I, JOHN WESLEY ROSS, a citizen of the United States, residing at Santa Clara, in the county of Santa Clara and State of California, have invented certain new and useful Improvements in Kitchen Implements, of which the following is a specification, reference being had therein to the accompanying drawings.

My invention consists of a kitchen implement in two parts, pivoted together, and provided with a lid-lifter, a hook for lifting vessels having bails, and two sets of grasping-jaws for handling the various kinds of kitchen utensils and the movable parts of stoves. One set of the jaws is adapted for handling shallow plates, pans, and grates, and the other set of jaws has one of its members bifurcated, to enable the implement to grasp and hold more firmly the side of a vessel, and these jaws are inclined toward the handles of the implement, adapting it especially for tilting and emptying vessels containing hot substances, as hereinafter fully described, and as shown in the drawings, in which—

Figure 2:
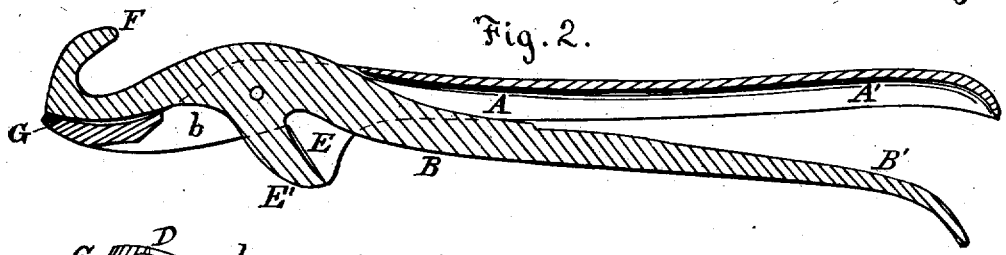
Figure 4:
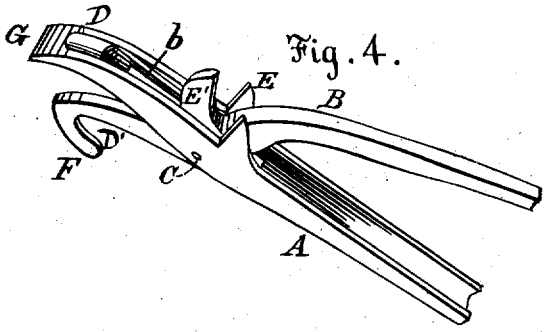
Figure 3:
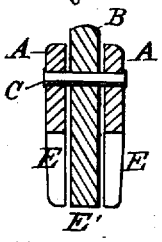

Figure 1 is a side view. Fig. 2 is a longitudinal sectional view. Fig. 3 is a transverse section on line *x x* of Fig. 1. Fig. 4 is a perspective view of the implement with the hook side downward. Figs. 5, 6, 7, 8, and 9 are views illustrating the manner of using the device.

Figure 5:
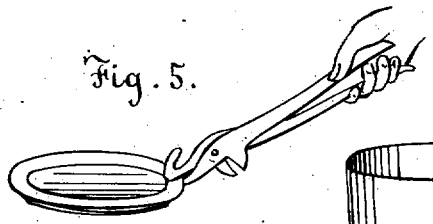
Figure 6:
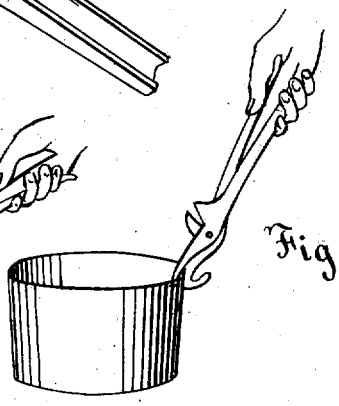

A and B represent the two parts of the implement pivoted together by a pin inserted through them at C. The part A is provided with a slot, *b*, to receive the part B, which is inserted through and pivoted in the slot, as shown in the drawings. The portions of the two parts of the implement extending beyond their pivotal connection are constructed to form the set of jaws D D′ and the hook F and lid-lifter G. These jaws are designed and adapted for grasping and handling any shallow plate, pan, or grate, and also gem-pans, which are very difficult to handle in the usual manner with a cloth, because of the great heat to which in use they are necessarily subjected. When the implement is employed for the above-named purposes it is used with the hook side upward, as shown in Fig. 5. By turning the hook side of the implement downward the jaws are in better position for handling vessels whose sides are nearly or entirely vertical, as shown in Fig. 6.

Figure 7:
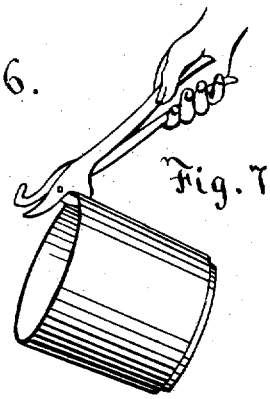

E E represent two projections formed on the part A, and E′ is a single projection formed on the part B, so arranged and constructed that when the two parts of the implement are adjusted and pivoted together the projection E′ is opposite the space between the two projections E E, forming thus a set of grasping-jaws, one member of which is bifurcated, to enable the jaws to grasp and hold more firmly on the side of a vessel. These jaws are inclined toward the handles A′ B′ of the implement, as shown in the drawings, adapting them especially for use in tilting and emptying vessels containing hot substances. The usual manner of emptying such vessels by hand with a cloth exposes the hand to the rising steam and heat. In using this implement for this purpose the hand is depressed by means of the inclination of the jaws, below the line of the top of the vessel, out of the line of the rising steam and heat, and where it is in a favorable position for tilting and emptying the vessel, which is accomplished without exposing or soiling the hand, as shown in Fig. 7 of the drawings.

Figure 8:
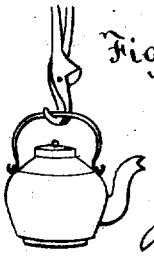

The hook F is used for lifting vessels having bails, as seen in Fig. 8, and for hanging it up when not in use.

Figure 9:
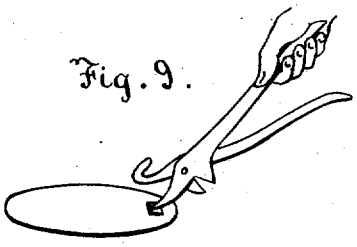

The end G of part A in its construction is adapted to be employed as a lid-lifter, and when thus used the implement is held by the handle A′, and the part B automatically assumes the position shown in Fig. 9.

What I claim as new, and desire to secure by Letters Patent, is—

1. A kitchen implement in two parts, pivoted together, each of the parts carrying one of the members of a set of grasping-jaws, inclined backwardly toward the handles, whereby a vessel containing hot substances may be handled and emptied with the implement without exposing the hand to the rising heat or steam, substantially as described.

2. A kitchen implement in two parts, A B, pivoted together at C, and provided with the set of grasping-jaws composed of the bifurcated member E E on the part A and the single member E′ on the part B, and inclined backwardly toward the handles A′ B′, substantially as and for the purposes described.

3. A kitchen implement in two parts, pivoted together and provided with the hook F, the lid-lifter G, and the two sets of jaws D D′ and E E′, constructed, arranged, and inclined substantially as and for the purposes described.

In testimony whereof I affix my signature in presence of two witnesses.

JOHN WESLEY ROSS.

Witnesses:
CURTIS THOMPSON,
AUGUSTUS ELLIOTT.